(12) United States Patent
Akama

(10) Patent No.: US 11,880,748 B2
(45) Date of Patent: Jan. 23, 2024

(54) INFORMATION PROCESSING APPARATUS, INFORMATION PROCESSING METHOD, AND INFORMATION PROCESSING PROGRAM

(71) Applicant: Sony Corporation, Tokyo (JP)

(72) Inventor: Taketo Akama, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/772,168

(22) PCT Filed: Oct. 10, 2019

(86) PCT No.: PCT/JP2019/040130
§ 371 (c)(1),
(2) Date: Jun. 12, 2020

(87) PCT Pub. No.: WO2020/080268
PCT Pub. Date: Apr. 23, 2020

(65) Prior Publication Data
US 2021/0232965 A1    Jul. 29, 2021

(30) Foreign Application Priority Data

Oct. 19, 2018    (JP) .................................. 2018-197971

(51) Int. Cl.
*G06F 7/00*    (2006.01)
*G06N 20/00*    (2019.01)
(Continued)

(52) U.S. Cl.
CPC ........... *G06N 20/00* (2019.01); *G06F 16/285* (2019.01); *G06F 16/65* (2019.01)

(58) Field of Classification Search
CPC ....... G06F 16/65; G06F 16/285; G06N 20/00; G06N 3/0472; G06N 3/0454; G06N 3/088;
(Continued)

(56) References Cited

U.S. PATENT DOCUMENTS 4,982,643 A * 1/1991 Minamitaka ......... G10H 1/0025
84/613
6,359,573 B1 * 3/2002 Taruguchi ............ G10H 1/0066
704/E19.009
(Continued)

FOREIGN PATENT DOCUMENTS

| JP | 2005-070806 A | 3/2005 |
| JP | 2011-175006 A | 9/2011 |
| JP | 2018-005520 A | 1/2018 |

OTHER PUBLICATIONS

Adam Roberts et al.: "A Hierarchical Latent Vector Model for Learning Long-Term Structure in Music", Arxiv .Org, Cornell University Library, 201 Ouin Library Cornell University Ithaca, NY 14853. Mar. 13, 2018 (Mar. 13, 2018), XP080864648, * abstract; figures 1-11 *Sections 1-3, 5 * Annexes A-C.
(Continued)

*Primary Examiner* — Mohammed R Uddin
(74) *Attorney, Agent, or Firm* — XSENSUS LLP

(57) ABSTRACT

An information processing apparatus (100) according to the present disclosure includes an acquiring unit (132) that uses a trained encoder to acquire a feature value of each set of partial data forming first content; a calculating unit (133) that calculates a relative feature value that is a relative feature value between sets of partial data from the acquired feature values of the sets of partial data to calculate a relative feature value sequence indicating a feature of a structure of the first content; and a generating unit (134) that generates
(Continued)

second content based on the relative feature value sequence of the first content and a feature value of optional data.

16 Claims, 5 Drawing Sheets

(51) Int. Cl.
    *G06F 16/28*     (2019.01)
    *G06F 16/65*     (2019.01)

(58) Field of Classification Search
    CPC ....... G10H 2210/061; G10H 2210/131; G10H 2250/311; G10H 1/0025
    See application file for complete search history.

(56) References Cited

U.S. PATENT DOCUMENTS

| | | | | |
|---|---|---|---|---|
| 6,784,354 | B1* | 8/2004 | Lu | G10H 1/00 84/616 |
| 9,286,877 | B1* | 3/2016 | Dabby | G10H 1/0025 |
| 10,068,557 | B1 | 9/2018 | Engel | |
| 11,357,431 | B2* | 6/2022 | Knight | G10L 25/63 |
| 11,360,909 | B1* | 6/2022 | Lercari | G06F 3/0616 |
| 11,361,763 | B1* | 6/2022 | Maas | G10L 15/16 |
| 2001/0003813 | A1* | 6/2001 | Sugano | G06F 16/64 707/E17.101 |
| 2003/0084064 | A1* | 5/2003 | Furuhashi | G06F 16/583 707/E17.02 |
| 2004/0017998 | A1* | 1/2004 | Kobayashi | H04H 60/04 386/230 |
| 2004/0024592 | A1* | 2/2004 | Matsunuma | G10L 19/022 704/E19.048 |
| 2005/0158037 | A1* | 7/2005 | Okabayashi | H04N 1/00198 386/353 |
| 2005/0241465 | A1* | 11/2005 | Goto | G06F 16/438 84/616 |
| 2006/0067593 | A1* | 3/2006 | Erol | H04N 19/162 375/E7.172 |
| 2006/0072165 | A1* | 4/2006 | Erol | H04N 21/44012 375/E7.2 |
| 2006/0230414 | A1* | 10/2006 | Zhang | G11B 27/22 |
| 2007/0113724 | A1* | 5/2007 | Kim | G10H 1/0025 84/609 |
| 2008/0075303 | A1* | 3/2008 | Kim | G10H 1/125 381/103 |
| 2008/0235267 | A1* | 9/2008 | Aprea | G06F 16/639 707/999.102 |
| 2009/0132074 | A1* | 5/2009 | Yamada | G10L 25/48 700/94 |
| 2009/0287323 | A1* | 11/2009 | Kobayashi | G10H 1/0008 84/453 |
| 2010/0064882 | A1* | 3/2010 | Miyajima | G11B 27/34 84/625 |
| 2011/0054910 | A1* | 3/2011 | Fujihara | G10L 15/26 704/278 |
| 2011/0246508 | A1* | 10/2011 | Maekawa | G06F 16/683 707/769 |
| 2012/0046771 | A1* | 2/2012 | Abe | G10H 1/16 700/94 |
| 2014/0020546 | A1* | 1/2014 | Sumi | G09B 15/00 84/609 |
| 2014/0260914 | A1* | 9/2014 | Matusiak | G10H 1/383 84/613 |
| 2022/0180188 | A1* | 6/2022 | Kamiyama | G06N 20/00 |
| 2022/0189084 | A1* | 6/2022 | Zimmerman | A61B 5/743 |

OTHER PUBLICATIONS

Ian Simon et al.: "Learning a Latent Space of Multitrack Measures": Arxiv.Org, Cornell University Library, 201 Olin Library Cornell University Ithaca, NY 14853. Jun. 1, 2018 (Jun. 1, 2018), XP080885987, * abstract; figures 1-5 *Sections 1-5.

Adam Roberts et al.: "MusicVAE: Creating a palette for musical scores with machine earning.", magenta, Mar. 15, 2018 (Mar. 15, 2018), XP055817753, Retrieved from the Internet:URL: https://magenta.tensorflow. orgimusic-vae [retrieved on Jun. 24, 2021] * pp. 6-14.

Xia Liang et al.: "MIDI-Sandwich: Multi-model Multi-task Hierarchical Conditional VAE-GAN networks for Symbolic Single-track Music Generation", Arxiv.Org. Cornell University Library, 201 Olin Library Cornell University Ithaca, NY14853. Jul. 2, 2019 (Jul. 2, 2019). XP081388832. * abstract; figures 1-8 ** Sections 1-4.

International Search Report and Written Opinion dated Dec. 24, 2019 for PCT/JP2019/040130 filed on Oct. 10, 2019, 8 pages including English Translation of the International Search Report.

Nagashima. H., and Shimizu. I., "Feature Extraction of Painting Style Using Deep Neural Network," The Institute of Electronics, Information and Communication Engineers and Information Processing Society of Japan, 2014, pp. 133-138.

Kokubo. Y. et al., "Fine-grained Pedestrian Classification by Fusing Multiple CNN Models," The Institute of Electronics, Information and Communication Engineers, IEICE Technical Report PRMU2016-166,CNR2016-33, 2017, pp. 81-85.

"Artificial intelligence that mimics the touch of masterpiece," 2017.

Briot. J. et al., "Deep Learning Techniques for Music Generation—A Survey," arXiv.org, 2017, pp. 1-108.

* cited by examiner

| SONG ID | PARTIAL DATA ID | PITCH INFORMA-TION | SOUND-LENGTH REST INFORMA-TION | CODE INFORMA-TION | RHYTHM INFORMA-TION | ... |
|---|---|---|---|---|---|---|
| ... | ... | ... | ... | ... | ... | ... |
| A01 | B01 | C01 | D01 | E01 | F01 | ... |
| | B02 | C02 | D02 | E02 | F02 | ... |
| | ... | ... | ... | ... | ... | ... |
| ... | ... | ... | ... | ... | ... | ... |

122

INFORMATION PROCESSING APPARATUS, INFORMATION PROCESSING METHOD, AND INFORMATION PROCESSING PROGRAM

CROSS-REFERENCE TO RELATED APPLICATIONS

The present application is based on PCT filing PCT/JP2019/040130, filed Oct. 10, 2019, which claims priority to JP 2018-197971, filed Oct. 19, 2018, the entire contents of each are incorporated herein by reference.

FIELD

The present disclosure relates to an information processing apparatus, an information processing method, and an information processing program. Specifically, it relates to a generation process of a trained model that is generated through machine learning.

BACKGROUND

Information processing using machine learning has been utilized in various technical fields. For example, the feature of content (image, music, or the like) is learnt by using a neural network representing the mechanism of a cranial nervous system so that, for example, new content is automatically generated.

For example, there is a disclosure of the technique in which the learning of the feature of the existing song makes it possible to automatically compose an appropriate song suitable for the lyrics without parameters input by the user other than the lyrics.

CITATION LIST

Patent Literature

Patent Literature 1: Japanese Laid-open Patent Publication No. 2011-175006

SUMMARY

Technical Problem

According to a conventional art, the linguistic feature value calculated from the lyrics data indicating the lyrics of each song and the attribute data indicating the attribute of the song are learnt and therefore, when new lyrics data is provided, the song suitable for the new lyrics data may be automatically generated.

According to the conventional art, however, a melody or a code are simply generated in accordance with the lyrics and, in terms of the structure (structure) of the entire song, a natural song like the one composed by a human is not always generated. That is, according to the conventional art, it is difficult to learn the feature of the overall structure of the content or to generate new content while maintaining the overall structure.

Therefore, the present disclosure provides an information processing apparatus, an information processing method, and an information processing program with which it is possible to learn the feature of the overall structure of content.

Solution to Problem

To solve the problem described above, an information processing apparatus includes: an acquiring unit that uses a trained encoder to acquire a feature value of each set of partial data forming first content; a calculating unit that calculates a relative feature value that is a relative feature value between sets of partial data from acquired feature values of the sets of partial data to calculate a relative feature value sequence indicating a feature of a structure of the first content; and a generating unit that generates second content based on the relative feature value sequence of the first content and a feature value of optional data.

DESCRIPTION OF EMBODIMENTS

Figure 1:
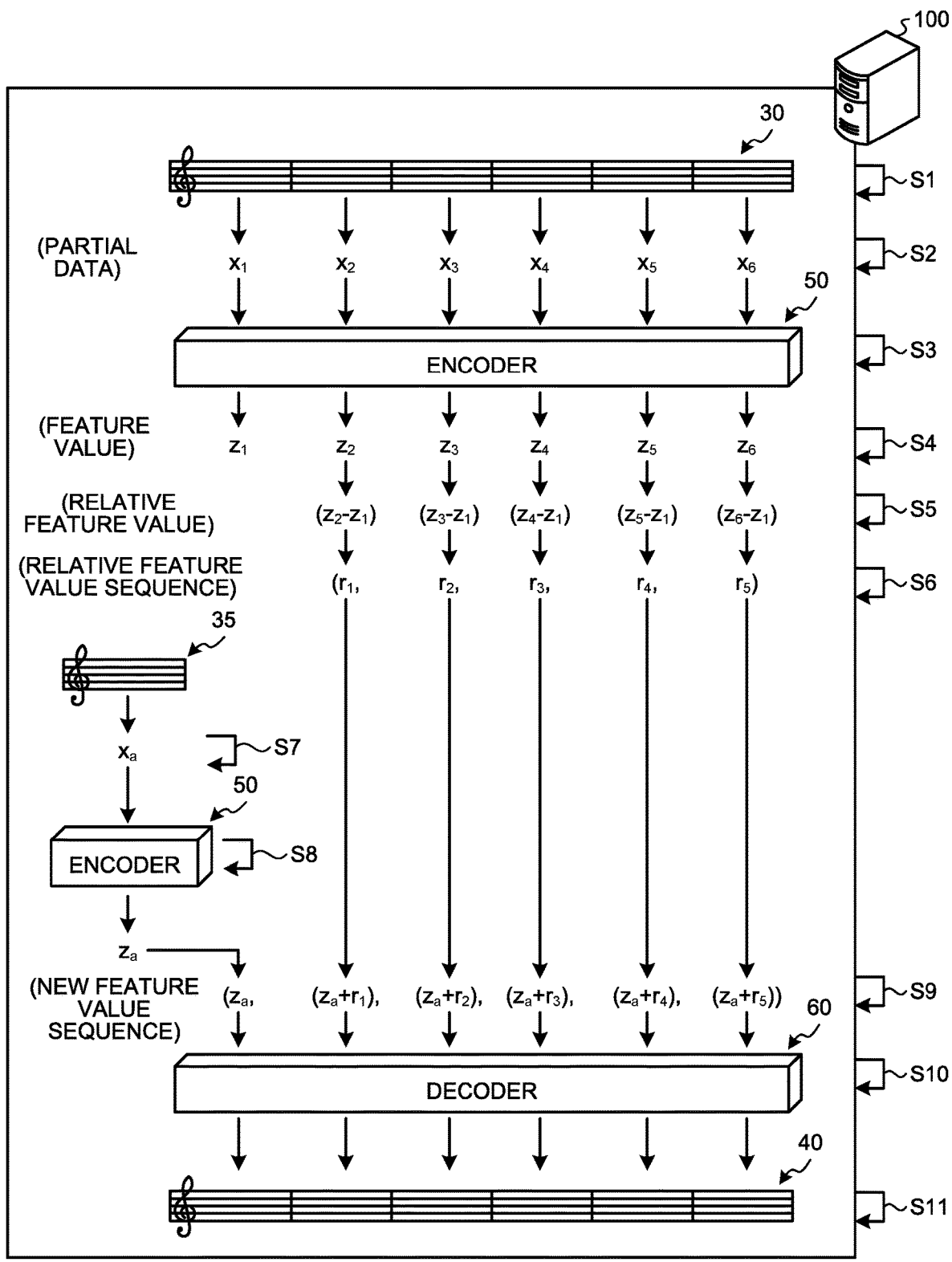
FIG. 1 is a diagram illustrating an example of information processing according to an embodiment of the present disclosure.

Embodiments of the present disclosure are described below in detail with reference to the drawings. Furthermore, in each of the following embodiments, the same components are denoted by the same reference numeral, and duplicated descriptions are omitted.

The present disclosure is described in accordance with the order of sections described below.
1. Embodiment
    1-1. Outline of information processing according to an embodiment of the present disclosure
    1-2. Configuration of an information processing apparatus according to an embodiment
    1-3. Steps of information processing according to an embodiment
2. Other embodiments
3. Hardware configuration

1. Embodiment

1-1. Outline of Information Processing According to an Embodiment of the Present Disclosure FIG. 1 is a diagram illustrating an example of information processing according to an embodiment of the present disclosure. The information processing according to the embodiment of the present disclosure is performed by an information processing apparatus 100 illustrated in FIG. 1.

The information processing apparatus 100 is an apparatus that performs the information processing according to the present disclosure and is, for example, an information processing terminal or a server device.

According to the embodiment, the information processing apparatus 100 includes a trained model for extracting the feature of content. According to the embodiment, the content includes digital data in a predetermined format, e.g., music (song), an image, or a moving image. In the example illustrated in FIG. 1, the information processing apparatus 100 uses a song as an example of the content for processing.

The trained model according to the embodiment includes: an encoder (encoder) that extracts a feature value from the data forming the content; and a decoder (decoder) that reconstructs the content from the extracted feature value. For example, the information processing apparatus 100 trains the encoder through unsupervised learning, such as VAE (Variational Auto Encoder) or GAN (Generative Adversarial Networks). Specifically, the information processing apparatus 100 inputs the content to the encoder, reconstructs the content from the extracted feature value, compares the original content with the reconstructed content, and adjusts the parameters of the encoder and the decoder. The information processing apparatus 100 repeats this process to optimize the parameters of the encoder and the decoder so as to generate the trained model. This allows the information processing apparatus 100 to generate the trained model that may obtain an appropriate feature value from the data forming the content. Furthermore, the feature value is represented by using, for example, a vector having a lower dimensional number as compared with the data on the input content.

Furthermore, the trained model is not limited to the above example and may be a model of any type as long as a feature value may be extracted and the content may be reconstructed from the extracted feature value.

In the example of FIG. 1, the information processing apparatus 100 inputs a song (in other words, the digital data representing the sound forming the song) to the encoder to extract, as the feature value of the song, the element representing the feature of the song, such as melody line, constituent sound, rhythm (the temporal structure of music, e.g., the number of notes and rests included, or the order of sounds to be reproduced), tempo, or beat. Moreover, according to the embodiment, the data on the song is represented by using the data (e.g., vector format) indicating the pitch (the data indicating the level of the sound to be produced), the sound length (the data indicating how long the produced note is to be retained), and the timing of a rest.

Here, for the automatic generation of a new song using the feature value of the existing song as described above, one of the challenges may be to generate a song having a natural structure like a human-made existing song. However, extracting the feature value of an optional song without change leads to the difficulty of generating a song having a natural structure as a whole although it is possible to reproduce the feature of the song. Specifically, even though the similar characteristic melody line or sound structure (also referred to as motif), which is a part of the song, is reproduced in an automatically generated song, it is difficult to reproduce the structure of the song itself, such as how the feature of the motif changes in the entire song. That is, it is conventionally difficult to automatically generate a song that has a natural structure like a human-made existing song and that has a certain length like an existing song.

Thus, through the information processing described below, the information processing apparatus 100 according to the present disclosure makes it possible to calculate the feature value indicating the structure of the entire song and to automatically generate a natural song by using the feature value. Specifically, the information processing apparatus 100 uses the trained encoder described above to acquire the feature value of each set of partial data (e.g., each bar) forming the song. Further, the information processing apparatus 100 calculates a relative feature value, which is a relative feature value between the sets of partial data, from the feature value of each set of partial data so as to calculate the relative feature value sequence indicating the feature of the structure of the song. As described above, the information processing apparatus 100 regards the song having a certain length as the sequence of partial data arranged, calculates the relative feature value of them to obtain the feature value that transitions in the entire song, and then expresses the structure of the entire song. In other words, the information processing apparatus 100 models the structure of the entire song by using the relative feature value sequence. Then, the information processing apparatus 100 uses the relative feature value sequence indicating the feature of the structure of the entire song to generate a new song. Thus, the information processing apparatus 100 may automatically generate a new song that maintains the feature of the structure of the existing song and has a natural structure. Furthermore, the sequence of feature values is the sequence of sequentially arranged feature values of the respective sets of partial data forming the song.

With reference to FIG. 1, the outline of the information processing according to the present disclosure is sequentially described below. Furthermore, in the following description, the target content from which a feature value is calculated is referred to as "first content", and the new content generated based on the relative feature value sequence of the first content is sometimes referred to as "second content". Further, the trained encoder illustrated in FIG. 1, and the like, is simply referred to as an "encoder". Moreover, the trained decoder is simply referred to as a "decoder".

As illustrated in FIG. 1, the information processing apparatus 100 first acquires a song 30 as the first content and divides the song 30 into partial data (Step S1). For example, the information processing apparatus 100 divides the song 30 on a per bar basis. Although the example in FIG. 1 illustrates the song 30 having six bars, the song 30 may have more bars.

The song 30 includes the symbol string (digital data) indicating, for example, a pitch, a sound length, or a rest. For example, the pitch represents the frequency indicating the level of a sound by using predetermined levels (e.g., 128 levels). Further, the sound length represents the length at which the reproduced sound is retained. Furthermore, the rest represents the timing at which the sound reproduction is stopped. Moreover, the data representing the song 30 may include information such as the symbol indicating the beat or the tempo of the song or the break of a bar, a code at a certain timing, or a constituent sound forming a code.

For example, the information processing apparatus 100 converts the above-described symbol string so as to be manipulated in a model. For example, the information processing apparatus 100 uses the vector representation (e.g., an embedding (embedding) vector having a pitch, a sound length, or the like, assigned to each dimension and representing sound information) of the above-described symbol string for processing. The embedding vector is, for example, a d-dimensional (d is any integer) vector in which "1" is input to the dimension that corresponds to the corresponding sound (e.g., information such as "C4" indicating the level of the sound) and "0" is input to the other dimensions. Furthermore, the data representing the sound may be expressed in the MIDI (Musical Instrument Digital Interface) (registered trademark) format, may be digital data having a known format and reproducible by a general-purpose sequencer, or may be represented as waveform data such as the WAV format.

The information processing apparatus 100 may use various known techniques to divide the song 30 into partial data. For example, the information processing apparatus 100 detects the pre-set break of a bar to divide the song into partial data (bars). Alternatively, the information processing apparatus 100 may divide the song 30 into partial data based on the relationship between a beat and a note. For example, in the case of the song 30 with 4/4 time signature, the information processing apparatus 100 detects, as a break, the time when the four sounds having the length corresponding to a quarter note are reproduced so as to divide the song 30 into bars.

Furthermore, the information processing apparatus 100 may use a break other than a bar for partial data. For example, the information processing apparatus 100 may detect the break (e.g., the position where the rest having a length more than a predetermined threshold appears) of a melody line of the song 30 to divide it into partial data. In this case, the partial data does not necessarily need to match with a bar.

The information processing apparatus 100 divides the song 30 into bars at Step S1 and extracts each set of partial data (Step S2). In the example of FIG. 1, each set of partial data is illustrated as "$x_n$ (n is any natural number)". For example, "$x_1$" indicates the data included in a first bar of the song 30.

Subsequently, the information processing apparatus 100 sequentially inputs the set of extracted partial data to an encoder 50 (Step S3). Accordingly, the information processing apparatus 100 acquires the feature value of each set of partial data (Step S4).

In the example of FIG. 1, the feature value of each set of partial data is denoted by "$z_n$". For example, "$z_1$" indicates the feature value of the first bar of the song 30.

Here, the information processing apparatus 100 calculates a relative feature value that is a relative feature value between the sets of partial data from the acquired feature value of each set of partial data (Step S5). For example, as the relative feature value between the sets of partial data, the information processing apparatus 100 subtracts the feature value of certain common partial data from the feature value of each set of partial data to calculate a relative feature value.

In the example of FIG. 1, the information processing apparatus 100 subtracts "$z_1$", which is the feature value of the first bar, from the feature value of each set of partial data to calculate the relative feature value. Furthermore, this calculation is an example, and the information processing apparatus 100 may perform addition, multiplication, or division on a feature value to calculate a relative feature value. Furthermore, the information processing apparatus 100 may subtract the partial data of a different bar from each set of partial data instead of "$z_1$".

The information processing apparatus 100 calculates a relative feature value sequence, which is the sequence of feature values indicating the structure of the song 30, based on the calculated relative feature values (Step S6). The relative feature value sequence is, for example, the sequence of sequentially arranged relative feature values such that they correspond to the structure of the song 30. Furthermore, in the example of FIG. 1, the relative feature value corresponding to "$z_{n+1}-z_1$" is indicated by "$r_n$". That is, in the example of FIG. 1, the relative feature value sequence corresponding to the song is represented as "(r1, r2, r3, r4, r5)".

As above, during the process up to Step S6, the information processing apparatus 100 calculates the relative feature value sequence indicating the structure of the song 30. Then, the information processing apparatus 100 acquires optional information that is the motif of the new song (the second content) to be generated.

For example, the information processing apparatus 100 acquires the data included in a first bar of a predetermined song 35 as the information that is the motif of the new song to be generated (Step S7). Furthermore, as the information that is the motif of the new song to be generated, the information processing apparatus 100 does not always need to acquire the data included in one bar but may acquire, for example, the data on the entire optional song.

In the example of FIG. 1, the acquired optional data (i.e., the data included in the first bar of the song 35) is denoted by "$x_a$".

Subsequently, the information processing apparatus 100 inputs "$x_a$" to the encoder 50 (Step S8). Thus, the information processing apparatus 100 acquires the feature value corresponding to "$x_a$". In the example of FIG. 1, the feature value corresponding to "$x_a$" is denoted by "$z_a$".

Then, the information processing apparatus 100 generates the feature value sequence corresponding to the newly generated second content based on the acquired feature value "$z_a$" and the relative feature values indicating the structure of the song 30 (Step S9). For example, the information processing apparatus 100 generates the feature value sequence in which "$z_a$" is at the beginning and "$z_a$" is attached to each of the relative feature values of the song 30. Specifically, the information processing apparatus 100 generates the feature value sequence having the information such as "($z_a$, $z_a$+r1, $z_a$+r2, $z_a$+r3, $z_a$+r4, $z_a$+r5)". That is, the information processing apparatus 100 generates the feature value sequence in which "$z_a$" is further attached to the feature of the structure of the song 30.

The information processing apparatus 100 inputs the feature value sequence generated at Step S9 to the decoder 60 (Step S10). The decoder 60 is a decoder that is trained to reconstruct content based on the feature value extracted by the encoder 50. In the example of FIG. 1, the decoder 60 reconstructs a song (accurately, the digital data for reproducing a sound) based on the feature value extracted by the encoder 50.

The information processing apparatus 100 acquires the sound data on each bar corresponding to the feature value sequence from the output of the decoder 60. The information processing apparatus 100 arranges the acquired data in the order of the sequence to generate a song 40 (Step S11). The song 40 is a song that uses the first bar of the song 35 as a motif and also maintains the feature of the structure of the song 30.

Thus, the information processing apparatus 100 according to the present disclosure uses the encoder 50 to acquire the feature value of each set of partial data forming the first content (the song 30 in the example of FIG. 1). Then, the information processing apparatus 100 calculates the relative feature value, which is the relative feature value between the sets of partial data, from the acquired feature value of each set of partial data to calculate the relative feature value sequence indicating the feature of the structure of the first content. That is, the information processing apparatus 100 acquires the sequence in which the feature values of the partial data forming the first content are arranged in order instead of calculating the feature value of the first content itself. Thus, the information processing apparatus 100 may extract the structure of the first content (the flow, the high point, or the like, of the entire song corresponding to the time direction if the first content is a song) as a feature.

Furthermore, the information processing apparatus 100 according to the present disclosure generates the second content (the song 40 in the example of FIG. 1) based on the relative feature value sequence of the first content and the feature value ("$z_a$" that is the feature value of the first bar of the song 35 in the example of FIG. 1) of optional data. That is, the information processing apparatus 100 generates a new feature value sequence based on the feature value sequence indicating the structure of the first content and the feature value of the new data and reconstructs the content based on the new feature value sequence. Thus, the information processing apparatus 100 may generate, as the second content, a new song that maintains the structure of the first content and adopts a new motif or constituent sound. Furthermore, in the example illustrated in FIG. 1, the information processing apparatus 100 subtracts the feature value "$z_1$" from the feature value of each set of partial data to calculate a relative feature value. However, this example is not a limitation, and the information processing apparatus 100 may calculate a relative feature value by using a feature value extractor that extracts a feature value like addition, subtraction, multiplication, division, or correlation. Furthermore, the information processing apparatus 100 may extract a graph structure based on the similarity or the causality of the feature value of each set of partial data and calculate a relative feature value sequence by using a machine learning technique, or the like, for graph data.

Figure 2:
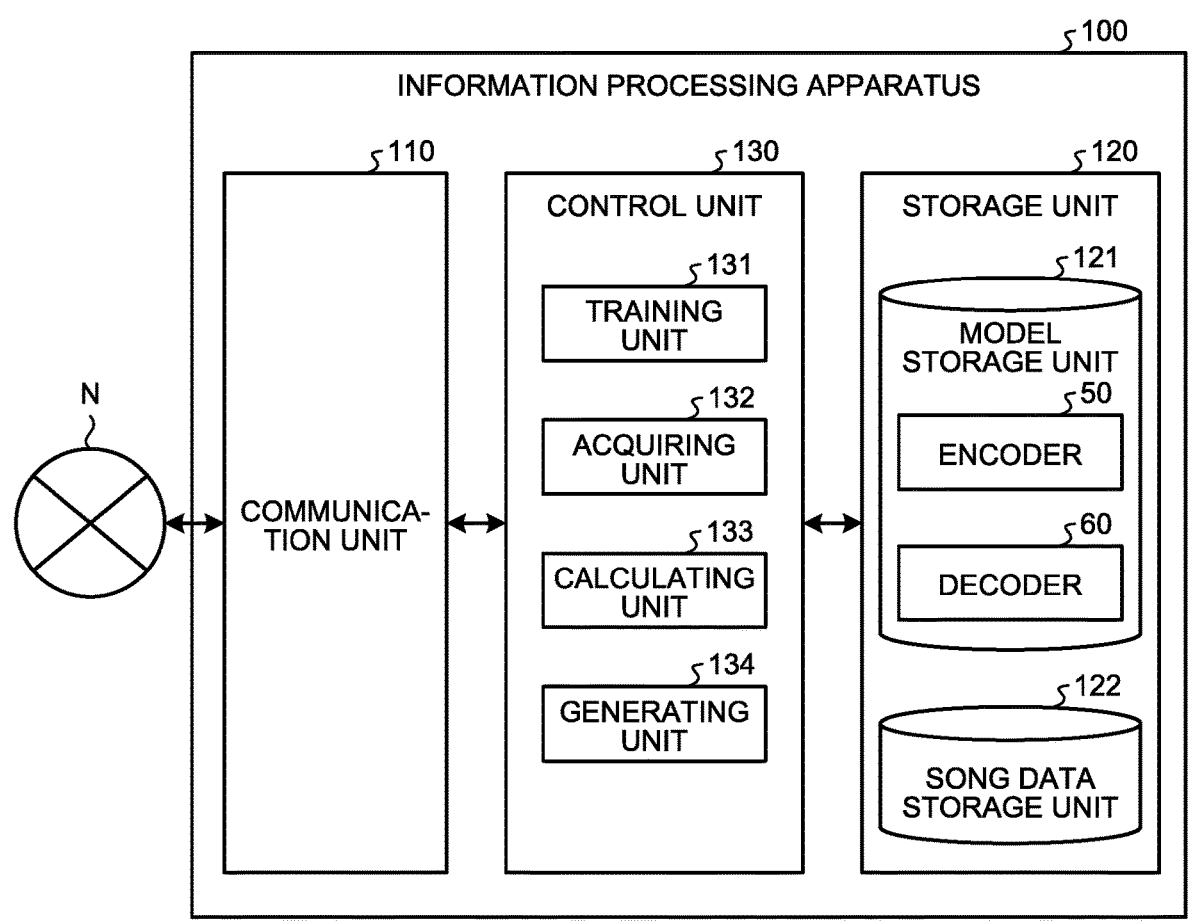
FIG. 2 is a diagram illustrating an example of the configuration of an information processing apparatus according to an embodiment of the present disclosure.

1-2. Configuration of the Information Processing Apparatus According to an Embodiment Next, the configuration of the information processing apparatus 100, which is an example of an information processing apparatus that performs information processing according to an embodiment, is described. FIG. 2 is a diagram illustrating an example of the configuration of the information processing apparatus 100 according to an embodiment of the present disclosure.

As illustrated in FIG. 2, the information processing apparatus 100 includes a communication unit 110, a storage unit 120, and a control unit 130. Furthermore, the information processing apparatus 100 may include an input unit (for example, a keyboard or a mouse) that receives various operations from an administrator, or the like, who manages the information processing apparatus 100 and a display unit (for example, a liquid crystal display) that displays various kinds of information.

The communication unit 110 is implemented by using, for example, an NIC (Network Interface Card). The communication unit 110 is connected to a network N (such as the Internet) via wired or wireless communications to transmit/receive information to/from other devices, or the like, via the network N.

The storage unit 120 is implemented by using, for example, a semiconductor memory device such as a RAM (Random Access Memory) or a flash memory (flash memory), or a storage device such as a hard disk or an optical disk. The storage unit 120 includes a model storage unit 121 and a song data storage unit 122.

The model storage unit 121 stores a trained model that has been trained in advance. Specifically, the model storage unit 121 includes the encoder 50 that extracts a feature value of the content and the decoder 60 that reconstructs the content. Furthermore, the model storage unit 121 may store training data such as the content used for training.

Figures 3, 4:
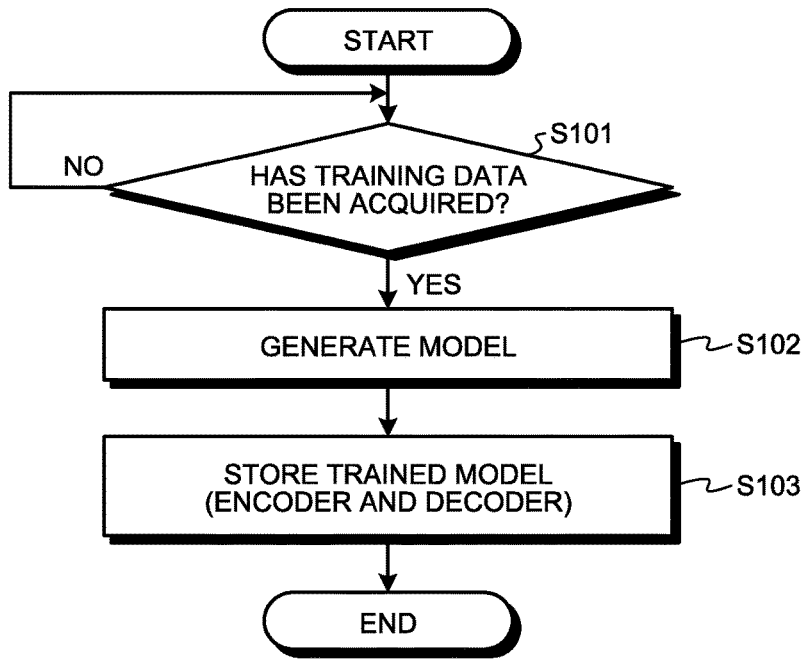
FIG. 3 is a diagram illustrating an example of a song data storage unit according to an embodiment of the present disclosure.
FIG. 4 is a flowchart (1) illustrating the steps of information processing according to an embodiment of the present disclosure.

The song data storage unit 122 stores data about the content (song) input to the model. FIG. 3 illustrates an example of the song data storage unit 122 according to an embodiment. FIG. 3 is a diagram illustrating an example of the song data storage unit 122 according to an embodiment of the present disclosure. In the example illustrated in FIG. 3, the song data storage unit 122 has items such as "song ID", "partial data ID", "pitch information", "sound-length rest information", "code information", and "rhythm information".

The "song ID" is the identification information for identifying a song. The "partial data ID" is the identification information for identifying partial data. The partial data corresponds to, for example, one or more bars forming a song.

The "pitch information" indicates the information on the pitch (scale) of the sound included in partial data. The "sound-length rest information" indicates the length (the reproduction time period or the number of beats to be reproduced) of a sound included in partial data, and the length and the timing of a rest. The "code information" indicates the type of code included in partial data, the constituent sound of a code, the switching of a code within a bar, and the like. The "rhythm information" indicates a beat or a tempo in a bar, the positions of a strong beat and a weak beat, and the like.

Although FIG. 3 has the conceptual description in which the item such as the pitch information is "C01", each item actually stores the specific data indicating the sound as described above. Although FIG. 3 illustrates the example in which "pitch information", "sound-length rest information", and the like, are stored as different items for the purpose of description, these sets of information may be collectively stored in one item, or the like, as the information indicating a note included in the bar. That is, the data format representing the song is not limited to that illustrated in FIG. 3 and may be any format that may be manipulated in the model.

For example, the example illustrated in FIG. 3 indicates that the song identified with the song ID "A01" includes the partial data identified with the partial data IDs "B01" and "B02". Furthermore, it is indicated that the partial data with the partial data ID "B01" includes the sound data represented with the pitch information "C01", the sound-length rest information "D01", the code information "E01", and the rhythm information "F01".

With reference back to FIG. 2, the description is continued. The control unit 130 is implemented when, for example, a CPU (Central Processing Unit) or an MPU (Micro Processing Unit) uses a RAM (Random Access Memory), or the like, as a work area and executes a program (e.g., an information processing program according to the present disclosure) stored in the information processing apparatus 100. Moreover, the control unit 130 is a controller (controller) and may be implemented by using an integrated circuit such as an ASIC (Application Specific Integrated Circuit) or an FPGA (Field Programmable Gate Array).

As illustrated in FIG. 2, the control unit 130 includes a training unit 131, an acquiring unit 132, a calculating unit 133, and a generating unit 134 to implement or perform the functions and the operation for the information processing described below. Furthermore, the internal configuration of the control unit 130 is not limited to the configuration illustrated in FIG. 2 and may be a different configuration as long as the configuration enables the information processing described later.

The training unit 131 uses content as training data to perform a predetermined training process so as to generate a trained model.

For example, to learn the sound data on a song, or the like, the training unit 131 inputs the sound data to the encoder 50 to extract the feature value of the sound data. Subsequently, the training unit 131 inputs the feature value of the sound data to the decoder 60 to reconstruct the sound data that has been input to the encoder 50. Then, the training unit 131 adjusts the parameters of the encoder 50 and the decoder 60 so as to reduce the difference between the successive sets of sound data. The training unit 131 repeats this process to generate a trained model with the encoder 50 and the decoder 60 that have been optimized. As described above, the training unit 131 may generate a model by using various known techniques such as VAE or GAN.

The acquiring unit 132 acquires various types of information. For example, the acquiring unit 132 acquires the first content to be input to the model trained by the training unit 131.

Further, the acquiring unit 132 divides the acquired first content to acquire the partial data forming the first content. For example, when the first content is a song, the acquiring unit 132 detects the break of a bar of the song by using the above-described technique and sets the detected bar as partial data.

Alternatively, the acquiring unit 132 may detect a rest that is more than the length of a predetermined threshold in the first content and divide the song into partial data based on the detected rest. In this case, the length of the predetermined threshold may be a time length, the percentage of the rest occupied in the bar, or the like.

Furthermore, the acquiring unit 132 uses the encoder 50 trained by the training unit 131 to acquire the feature value of each set of partial data forming the first content.

Specifically, the acquiring unit 132 inputs the symbol string indicating the pitch, the sound length, and the rest to the encoder 50 as the data indicating the sound included in the partial data to acquire the feature value corresponding to the partial data. The feature value is represented as, for example, a vector having a lower dimensional number as compared with the vector representing the original partial data.

The calculating unit 133 calculates a relative feature value, which is a relative feature value between the sets of partial data, from the feature value of each set of partial data acquired by the acquiring unit 132 to calculate a relative feature value sequence indicating the feature of the structure of the first content.

For example, the calculating unit 133 executes addition, subtraction, multiplication, or division on the feature value of certain partial data of the first content and the feature value of each set of partial data other than the certain partial data to calculate a relative feature value so as to calculate a relative feature value sequence. The certain partial data of the first content indicates specific partial data in the partial data forming the first content and, in the example of FIG. 1, corresponds to the feature value "$z_1$" of the first bar of the song 30. Thus, the calculating unit 133 performs an operation such as addition, subtraction, multiplication, or division on a plurality of sets of partial data with specific partial data to calculate a relative feature value having a relationship.

Furthermore, FIG. 1 illustrates the example where the feature value "$z_1$" of the first bar of the song 30 is subtracted from the feature value of each set of partial data of the song 30; however, the operation is not limited to this example. For example, the calculating unit 133 may calculate a relative feature value between the feature value of certain partial data on the first content and the feature value of each set of partial data that is other than the certain partial data and has a causal relationship with the certain partial data so as to calculate a relative feature value sequence.

Here, the partial data having a causal relationship with certain partial data refers to the partial data having some kind of correspondence relationship with the certain partial data. For example, if the content is a song, there may be a bar corresponding to a certain bar (for example referred to as a call-and-response relationship) in the song. In this case, as described above, the calculating unit 133 may preferentially perform the addition (or subtraction) operation on the feature values of the bars having some kind of causal relationship so as to emphasize or de-emphasize the structure of the song. Furthermore, the causal relationship between the sets of partial data of the content may be obtained by using a technique in which a song is analyzed by using a known machine learning technique such as causal inference and the relationship between a certain bar and a factor bar is quantified.

Furthermore, the calculating unit 133 may calculate a relative feature value by using various known techniques, such as generating, as a graph, the partial data in the content based on a predetermined relationship and adding or subtracting the sets of partial data having a close relationship in the graph.

As described above, the calculating unit 133 calculates the relative feature value that is the relative feature value between the sets of partial data by using various techniques and sequentially arranges the calculated relative feature values to calculate the relative feature value sequence indicating the feature of the structure of the first content. The calculating unit 133 sends the calculated relative feature value to the generating unit 134.

The generating unit 134 generates the second content based on the relative feature value sequence of the first content and the feature value of optional data.

For example, the generating unit 134 calculates a new feature value sequence based on the relative feature value sequence of the first content calculated by the calculating unit 133 and the feature value of optional data. Then, the generating unit 134 inputs each feature value included in the new feature value sequence to the decoder 60 and reconstructs the partial data corresponding to each feature value. Further, the generating unit 134 combines the reconstructed partial data in order of the sequence to generate the second content that is new content.

When the relative feature value sequence of the first content, which is a song, has been acquired, the generating unit 134 may generate an optional new song as the second content. In this case, the acquiring unit 132 inputs the symbol string indicating the pitch, the sound length, and the rest to the encoder 50 as the data indicating the sound included in the partial data and the optional data to acquire the feature value corresponding to the partial data and the optional data. Then, based on the feature value acquired by the acquiring unit 132, the calculating unit 133 calculates the relative feature value sequence corresponding to each set of partial data. The generating unit 134 generates a new feature value sequence based on the relative feature value sequence calculated by the calculating unit 133 and the feature value corresponding to optional data (for example, the sound data that is the motif of a new content) and generates the second content, which is a song, from the generated new feature value sequence.

1-3. Steps of the Information Processing According to an Embodiment

Next, the steps of the information processing according to an embodiment are described with reference to FIG. 4 and FIG. 5. First, the flow of a training process according to an embodiment of the present disclosure is described with reference to FIG. 4. FIG. 4 is a flowchart (1) illustrating the steps of the information processing according to an embodiment of the present disclosure.

As illustrated in FIG. 4, the information processing apparatus 100 determines whether the training data (content) has been acquired (Step S101). When no training data has been acquired (Step S101: No), the information processing apparatus 100 stands by until training data is acquired.

Conversely, when training data has been acquired (Step S101; Yes), the information processing apparatus 100 generates a model using the training data (Step S102). Then, the information processing apparatus 100 stores the trained model (the encoder and the decoder) in the storage unit 120 (Step S103).

Next, the flow of a generation process according to an embodiment of the present disclosure is described with reference to FIG. 5. FIG. 5 is a flowchart (2) illustrating the steps of the information processing according to an embodiment of the present disclosure.

Figure 5:
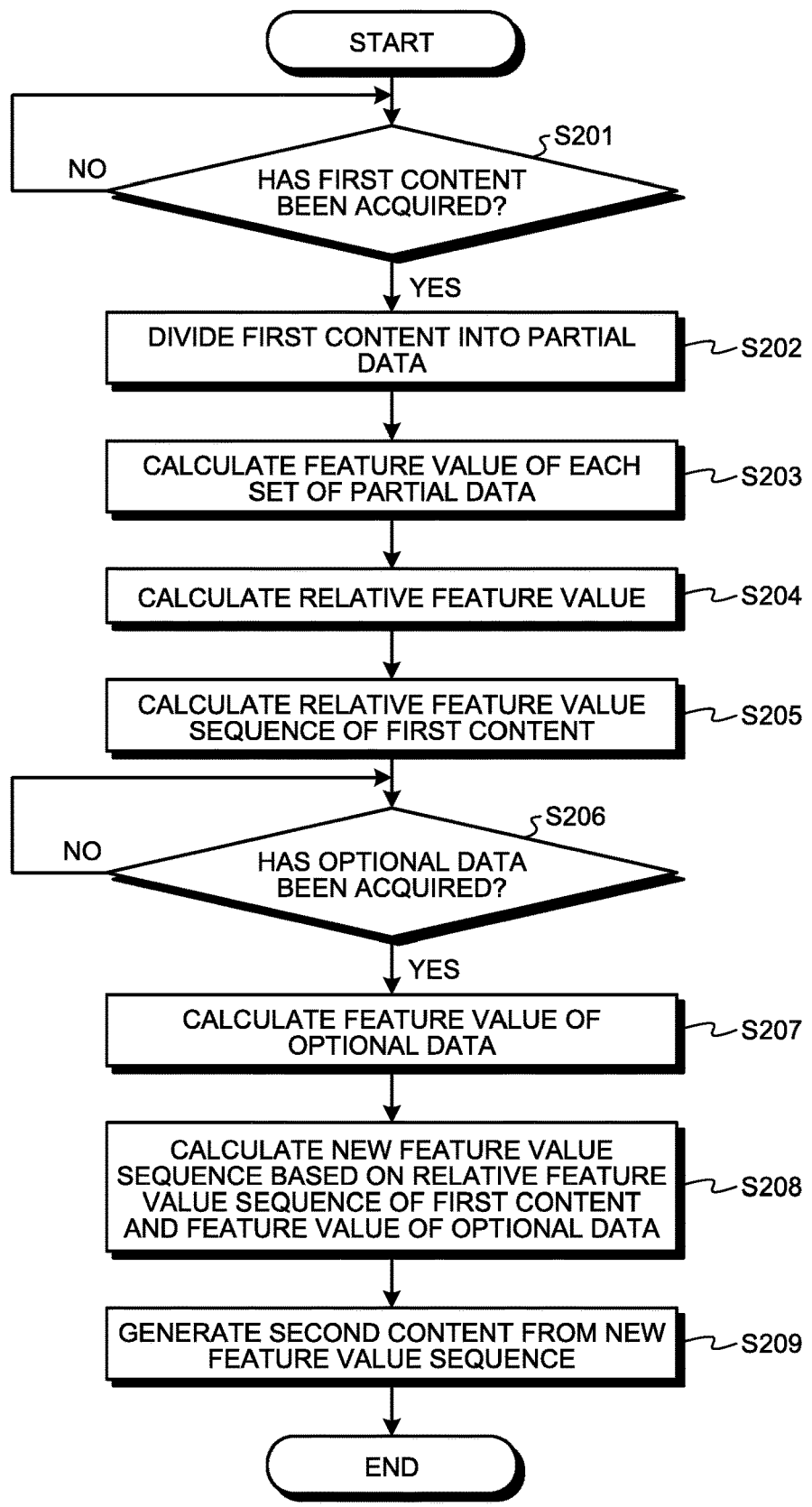
FIG. 5 is a flowchart (2) illustrating the steps of information processing according to an embodiment of the present disclosure.

As illustrated in FIG. 5, the information processing apparatus 100 determines whether the first content has been acquired (Step S201). When the first content has not been acquired (Step S201; No), the information processing apparatus 100 stands by until the first content is acquired.

Conversely, when the first content has been acquired (Step S201; Yes), the information processing apparatus 100 divides the first content into partial data (Step S202). For example, when the first content is a song, the information processing apparatus 100 divides the song into partial data on each bar.

Subsequently, the information processing apparatus 100 inputs each set of partial data to the encoder 50 to calculate the feature value of each set of partial data (Step S203). Further, the information processing apparatus 100 performs a predetermined operation on the feature values of the sets of partial data to calculate a relative feature value (Step S204).

Based on the relative feature value, the information processing apparatus 100 calculates the relative feature value sequence indicating the feature of the structure of the first content (Step S205).

Then, the information processing apparatus 100 determines whether optional data (e.g., one bar of a certain song), which is the motif, or the like, of the second content to be generated, has been acquired (Step S206). When no optional data has been acquired (Step S206; No), the information processing apparatus 100 stands by until optional data is acquired.

Conversely, when optional data has been acquired (Step S206; Yes), the information processing apparatus 100 inputs the optional data to the encoder 50 to calculate the feature value of the optional data (Step S207).

Subsequently, the information processing apparatus 100 calculates a new feature value sequence, which is the source of the second content, based on the relative feature value sequence of the first content and the feature value of the optional data (Step S208).

Then, the information processing apparatus 100 inputs the new feature value sequence to the decoder 60 to generate the second content from the new feature value sequence (Step S209).

2. Other Embodiments

The processes according to each of the above-described embodiments may be implemented in various different embodiments other than the embodiments described above.

According to the above-described embodiment, examples of the content include song (music). However, the information processing apparatus 100 may perform the information processing according to the present disclosure using text data, a moving image, or the like, as the content.

For example, the information processing apparatus 100 acquires the feature value of each set of partial data forming the first content that is text data. Then, the information processing apparatus 100 generates the second content, which is text data, on the basis of the relative feature value sequence of the first content obtained based on the acquired feature value of each set of partial data and the feature value of optional data, which is text data. In this case, it is assumed that the information processing apparatus 100 generates the trained model for outputting the feature value of text data.

In this case, examples of the text data include a poem or a thirty-one-syllable poem. For example, the information processing apparatus 100 acquires the poem including a plurality of sentences (for example, a text divided by a line feed symbol). Then, the information processing apparatus 100 detects a line feed symbol included in the poem to divide the poem into partial data (a sentence of each row). Subsequently, the information processing apparatus 100 calculates the relative feature value of the partial data to obtain the relative feature value sequence corresponding to the poem.

When new optional data (for example, the desired phrase, sentence, or the like, to be included in the poem by the user) is acquired, the information processing apparatus 100 calculates the feature value of the optional data and calculates a new feature value sequence based on the calculated feature value and the relative feature value sequence corresponding to the poem. Then, the information processing apparatus 100 generates a new poem as the second content from the new feature value sequence.

This allows the information processing apparatus 100 to generate a new poem that has a structure (e.g., the number of characters at the break (rhythm), a phoneme, or the expression of a phrase appearing in the next sentence) similar to that of the existing poem.

Furthermore, the information processing apparatus 100 may generate new moving image content based on moving image content instead of text data. In this case, it is assumed that the information processing apparatus 100 generates the trained model that outputs the feature value of the image forming the moving image content.

For example, the information processing apparatus 100 acquires the feature value of each set of partial data forming the first content that is moving image content. In this case, the partial data is, for example, the image corresponding to each frame forming the moving image content. Furthermore, the partial data may be, for example, the image data obtained by collecting and averaging several frames as well as a single still image. Then, the information processing apparatus 100 generates the second content, which is moving image content, based on the relative feature value sequence of the first content obtained based on the acquired feature value of each set of partial data and the feature value of optional data, which is moving image or image content.

This allows the information processing apparatus 100 to generate new moving image content having a structure similar to that of the existing moving image content. For example, on the basis of the moving image content that captures a series of motions of a blooming flower, the moving image content that captures the moving image of a walking person, or the like, the information processing apparatus 100 generates new moving image content of a different object performing a similar action. Thus, the information processing apparatus 100 may automatically generate various types of new content that have a similar content structure in whole as well as songs through the information processing according to the present disclosure.

Further, the information processing apparatus 100 may apply the information processing according to the present disclosure so as to perform the process to detect, for example, a substance that causes a similar taste based on the taste information on a human. For example, in terms of the human's taste, it is supposed that, if a human perceives elements, sequentially a first element, a second element, and then a third element, he has a tendency to feel a specific taste (e.g., sweet taste). In this case, the information processing apparatus 100 may calculate a relative feature value of the substance having the structure that causes a human to perceive elements, sequentially the first element, the second element, and then the third element, so as to generate a new substance having a similar structure.

Further, in the example described according to the above embodiment, the song 30 is divided into bars to calculate a feature value sequence; however, for example, the information processing apparatus 100 may regard a plurality of songs as the first content and regard each of the songs as one set of partial data to calculate the feature value sequence indicating the songs. In this case, the information processing apparatus 100 may express the feature such as the structure of the sequence of the songs. Specifically, as the order of the sequence of the songs, the information processing apparatus 100 expresses the feature of the structure such that a positive song (e.g., an up-tempo song) comes first and a relatively negative song comes next. As described in the above embodiment, the information processing apparatus 100 may shift the feature of the structure to different content. Thus, for example, when other songs are rearranged, the information processing apparatus 100 may generate a list having a structure similar to that of the first content (i.e., a playlist in which the order of songs is automatically rearranged).

Furthermore, among the processes described in each of the above embodiments, all or some of the processes that are automatically performed as described above may be performed manually, or all or some of the processes that are manually performed as described above may be performed automatically by using a well-known method. Furthermore, the process steps, the specific names, and the information including various types of data and parameters as described in the above description and drawings may be optionally changed except as otherwise noted. For example, various types of information illustrated in each of the figures are not limited to the information illustrated.

Furthermore, the components of each device illustrated are functionally conceptual and do not necessarily need to be physically configured as illustrated in the drawings. Specifically, specific forms of separation and combination of devices are not limited to those depicted in the drawings, and a configuration may be such that all or some of them are functionally or physically separated or combined in any unit depending on various types of loads or usage.

Furthermore, the above-described embodiments and modifications may be combined as appropriate as long as the consistency is ensured in the processing details.

Moreover, as the advantage described in this description is merely an example, there is no limitation, and other advantages may be produced.

3. Hardware Configuration

Figure 6:
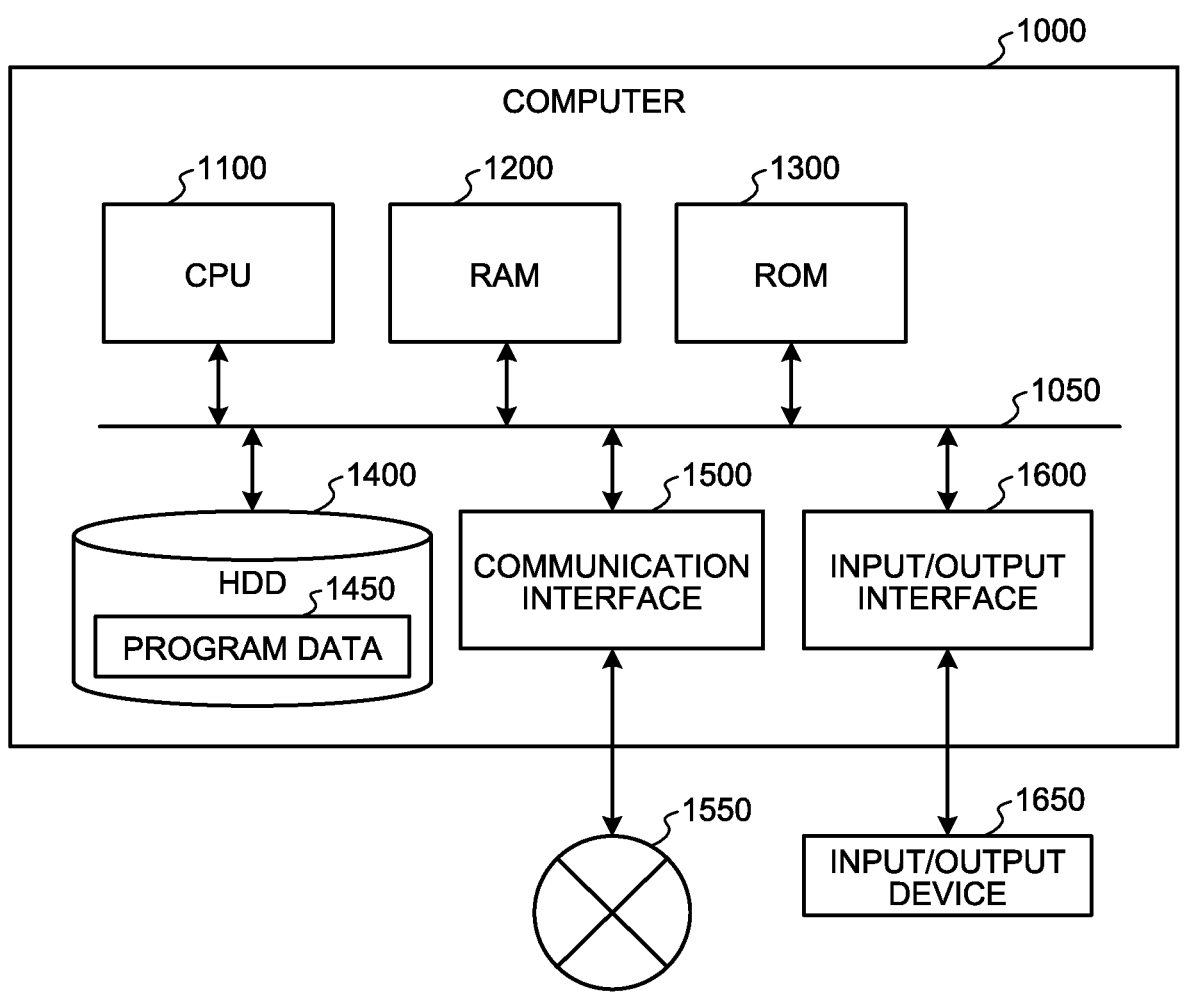
FIG. 6 is a hardware configuration diagram illustrating an example of a computer that performs a function of the information processing apparatus.

An information apparatus such as the information processing apparatus 100 according to the above-described embodiments is implemented by using a computer 1000 having the configuration illustrated in for example FIG. 6. The information processing apparatus 100 according to the embodiment is described below as an example. FIG. 6 is a hardware configuration diagram illustrating an example of the computer 1000 that performs a function of the information processing apparatus 100. The computer 1000 includes a CPU 1100, a RAM 1200, a ROM (Read Only Memory) 1300, an HDD (Hard Disk Drive) 1400, a communication interface 1500, and an input/output interface 1600. The units of the computer 1000 are connected via a bus 1050.

The CPU 1100 operates based on a program stored in the ROM 1300 or the HDD 1400 to control each unit. For example, the CPU 1100 loads a program stored in the ROM 1300 or the HDD 1400 into the RAM 1200 to execute the processes corresponding to various programs.

The ROM 1300 stores, for example, a boot program such as BIOS (Basic Input Output System) executed by the CPU 1100 at the time of the start-up of the computer 1000 and a program that is dependent on the hardware of the computer 1000.

The HDD 1400 is a computer-readable recording medium that records a program to be executed by the CPU 1100, data to be used by the program, and the like, in a non-transitory manner. Specifically, the HDD 1400 is a recording medium that records an information processing program according to the present disclosure, which is an example of program data 1450.

The communication interface 1500 is an interface with which the computer 1000 is connected to an external network 1550 (e.g., the Internet). For example, the CPU 1100 receives data from a different device or transmits the data generated by the CPU 1100 to a different device via the communication interface 1500.

The input/output interface 1600 is an interface for connecting the input/output device 1650 and the computer 1000. For example, the CPU 1100 receives data from an input device such as a keyboard or a mouse via the input/output interface 1600. Furthermore, the CPU 1100 transmits data to an output device such as a display, a speaker, or a printer via the input/output interface 1600. Further, the input/output interface 1600 may function as a medium interface for reading a program, or the like, recorded in a predetermined recording medium (media). Examples of the medium include an optical recording medium such as a DVD (Digital Versatile Disc) and a PD (Phase change rewritable Disk), a magneto-optical recording medium such as an MO (Magneto-Optical disk), a tape medium, a magnetic recording medium, or a semiconductor memory.

For example, when the computer 1000 functions as the information processing apparatus 100 according to the embodiment, the CPU 1100 of the computer 1000 executes the information processing program loaded into the RAM 1200 to perform the functions of the control unit 130, and the like. Furthermore, the HDD 1400 stores the information processing program according to the present disclosure and data in the storage unit 120. Moreover, although the CPU 1100 reads and executes the program data 1450 from the HDD 1400, it may acquire the programs from a different device via the external network 1550 according to another example.

Further, this technology may also include the configuration described below.

(1)

An information processing apparatus comprising:
an acquiring unit that uses a trained encoder to acquire a feature value of each set of partial data forming first content;
a calculating unit that calculates a relative feature value that is a relative feature value between sets of partial data from acquired feature values of the sets of partial data to calculate a relative feature value sequence indicating a feature of a structure of the first content; and
a generating unit that generates second content based on the relative feature value sequence of the first content and a feature value of optional data.

(2)

The information processing apparatus according to (1), wherein the calculating unit executes addition, subtraction, multiplication, or division on a feature value of certain partial data of the first content and a feature value of each set of partial data other than the certain partial data to calculate the relative feature value so as to calculate the relative feature value sequence.

(3)

The information processing apparatus according to (1) or (2), wherein the calculating unit calculates a relative feature value between a feature value of certain partial data of the first content and a feature value of each set of partial data that is other than the certain partial data and that has a causal relationship with the certain partial data so as to calculate the relative feature value sequence.

(4)

The information processing apparatus according to any one of (1) to (3), wherein the generating unit inputs a feature value sequence calculated from a relative feature value sequence of the first content and a feature value of optional data into a trained decoder to generate the second content.

(5)

The information processing apparatus according to any one of (1) to (4), wherein the generating unit generates an optional song as the second content based on a relative feature value sequence of the first content that is a song.

(6)

The information processing apparatus according to (5), wherein
the acquiring unit inputs, as data indicating a sound included in the partial data and in the optional data, a symbol string indicating a pitch, a sound length, and a rest to the trained encoder to acquire feature values corresponding to the partial data and the optional data, and
the generating unit inputs the relative feature value sequence obtained based on acquired feature values of the optional data and the partial data to the trained decoder to generate the second content.

(7)

The information processing apparatus according to any one of (1) to (4), wherein the acquiring unit acquires a feature value of each set of partial data forming the first content that is text data, and
the generating unit generates the second content that is text data based on a relative feature value sequence of the first content obtained based on the acquired feature value of each set of partial data and the feature value of the optional data that is text data.

(8)

The information processing apparatus according to any one of (1) to (4), wherein
the acquiring unit acquires a feature value of each set of partial data forming the first content that is moving image content, and
the generating unit generates the second content that is moving image content based on a relative feature value sequence of the first content obtained based on the acquired feature value of each set of partial data and the feature value of the optional data that is moving image or image content.

(9)

The information processing apparatus according to any one of (1) to (6), wherein the acquiring unit detects a break of a bar of the first content that is a song and acquires a feature value of each detected bar.

(10)

The information processing apparatus according to any one of (1) to (6), wherein the acquiring unit detects a rest that is more than a length of a predetermined threshold in the first content that is a song, divides the song into partial data based on the detected rest, and acquires a feature value of each set of divided partial data.

(11)

An information processing method causing a computer to:
use a trained encoder to acquire a feature value of each set of partial data forming first content;
calculate a relative feature value that is a relative feature value between sets of partial data from acquired feature values of the sets of partial data to calculate a relative feature value sequence indicating a feature of a structure of the first content; and
generate second content based on the relative feature value sequence of the first content and a feature value of optional data.

(12)

An information processing program causing a computer to function as:
an acquiring unit that uses a trained encoder to acquire a feature value of each set of partial data forming first content;
a calculating unit that calculates a relative feature value that is a relative feature value between sets of partial data from acquired feature values of the sets of partial data to calculate a relative feature value sequence indicating a feature of a structure of the first content; and
a generating unit that generates second content based on the relative feature value sequence of the first content and a feature value of optional data.

REFERENCE SIGNS LIST

100 INFORMATION PROCESSING APPARATUS
110 COMMUNICATION UNIT
120 STORAGE UNIT
121 MODEL STORAGE UNIT
122 SONG DATA STORAGE UNIT

130 CONTROL UNIT
131 TRAINING UNIT
132 ACQUIRING UNIT
133 CALCULATING UNIT
134 GENERATING UNIT

The invention claimed is:

1. An information processing apparatus comprising: circuitry configured to:
   use a trained encoder to acquire a feature value of each set of partial data forming first content;
   calculate a relative feature value that is an addition or subtraction value between each set of partial data from acquired feature values of the sets of partial data to calculate a relative feature value sequence indicating a feature of a structure of the first content;
   acquire optional data and calculate a new feature value sequence based on the relative feature value sequence of the first content and a feature value of the optional data; and
   generate second content based on the relative feature value sequence of the first content and the feature value of the optional data.

2. The information processing apparatus according to claim 1, wherein the circuitry is configured to execute addition, subtraction, multiplication, or division on a feature value of certain partial data of the first content and a feature value of each set of partial data other than the certain partial data to calculate the relative feature value so as to calculate the relative feature value sequence.

3. The information processing apparatus according to claim 1, wherein the circuitry is configured to calculate a relative feature value between a feature value of certain partial data of the first content and a feature value of each set of partial data that is other than the certain partial data and that has a causal relationship with the certain partial data so as to calculate the relative feature value sequence.

4. The information processing apparatus according to claim 1, wherein the circuitry is configured to generate the second content by inputting the relative feature value sequence of the first content and the feature value of the optional data.

5. The information processing apparatus according to claim 1, wherein the circuitry is configured to generate an optional song as the second content based on a relative feature value sequence of the first content that is a song.

6. The information processing apparatus according to claim 5, wherein
   the circuitry is configured to input, as data indicating a sound included in the partial data and in the optional data, a symbol string indicating a pitch, a sound length, and a rest to the trained encoder to acquire feature values corresponding to the partial data and the optional data, and
   the circuitry is configured to input the relative feature value sequence obtained based on acquired feature values of the optional data and the partial data to the trained decoder to generate the second content.

7. The information processing apparatus according to claim 1, wherein
   the circuitry is configured to acquire a feature value of each set of partial data forming the first content that is text data, and
   the circuitry is configured to generate the second content that is text data based on a relative feature value sequence of the first content obtained based on the acquired feature value of each set of partial data and the feature value of the optional data that is text data.

8. The information processing apparatus according to claim 1, wherein
   the circuitry is configured to acquire a feature value of each set of partial data forming the first content that is moving image content, and
   the circuitry is configured to generate the second content that is moving image content based on a relative feature value sequence of the first content obtained based on the acquired feature value of each set of partial data and the feature value of the optional data that is moving image or image content.

9. The information processing apparatus according to claim 1, wherein the circuitry is configured to detect a break of a bar of the first content that is a song and acquires a feature value of each detected bar.

10. The information processing apparatus according to claim 1, wherein the circuitry is configured to detect a rest that is more than a length of a predetermined threshold in the first content that is a song, divide the song into partial data based on the detected rest, and acquire a feature value of each set of divided partial data.

11. An information processing method comprising:
    using a trained encoder to acquire a feature value of each set of partial data forming first content;
    calculating a relative feature value that is an addition or subtraction value between each set of partial data from acquired feature values of the sets of partial data to calculate a relative feature value sequence indicating a feature of a structure of the first content;
    acquiring optional data and calculate a new feature value sequence based on the relative feature value sequence of the first content and a feature value of the optional data; and
    generating second content based on the relative feature value sequence of the first content and the feature value of the optional data.

12. A non-transitory computer-readable medium storing executable instructions, which when executed by circuitry, cause the circuitry to execute a method comprising:
    using a trained encoder to acquire a feature value of each set of partial data forming first content;
    calculating a relative feature value that is an addition or subtraction value between each set of partial data from acquired feature values of the sets of partial data to calculate a relative feature value sequence indicating a feature of a structure of the first content;
    acquiring optional data and calculate a new feature value sequence based on the relative feature value sequence of the first content and a feature value of the optional data; and
    generating second content based on the relative feature value sequence of the first content and the feature value of the optional data.

13. The information processing apparatus according to claim 1, wherein the first content is a song.

14. The information processing apparatus according to claim 1, wherein the first content is text data.

15. The information processing apparatus according to claim 14, wherein the text data is a poem.

16. The information processing apparatus according to claim 1, wherein the first content is a moving image.

* * * * *